Dec. 11, 1934.    J. M. CHRISTMAN    1,983,792
MEANS FOR STRIPING
Filed June 28, 1929    2 Sheets-Sheet 1
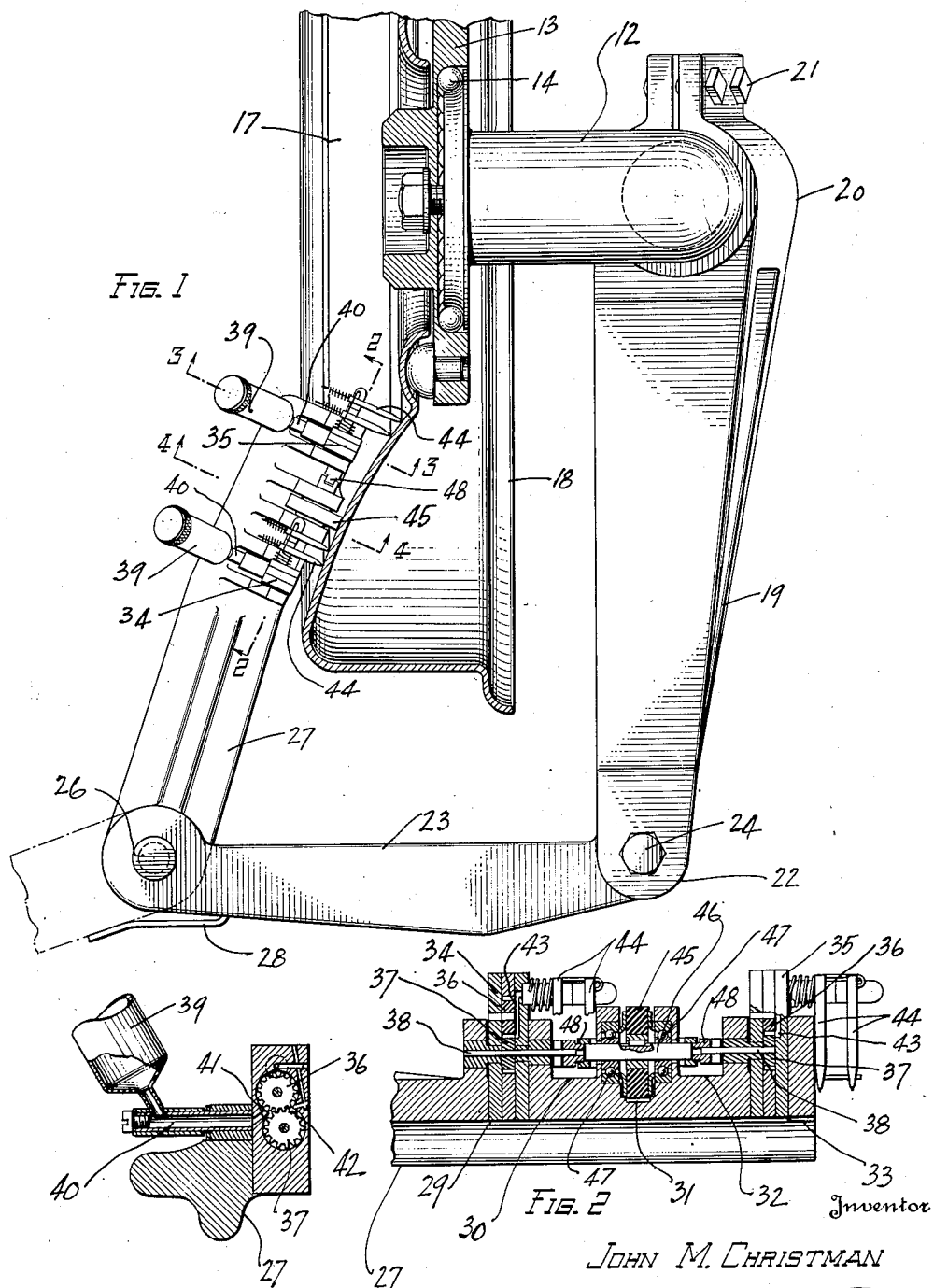
Inventor
JOHN M. CHRISTMAN Dec. 11, 1934. J. M. CHRISTMAN 1,983,792
MEANS FOR STRIPING
Filed June 28, 1929 2 Sheets-Sheet 2
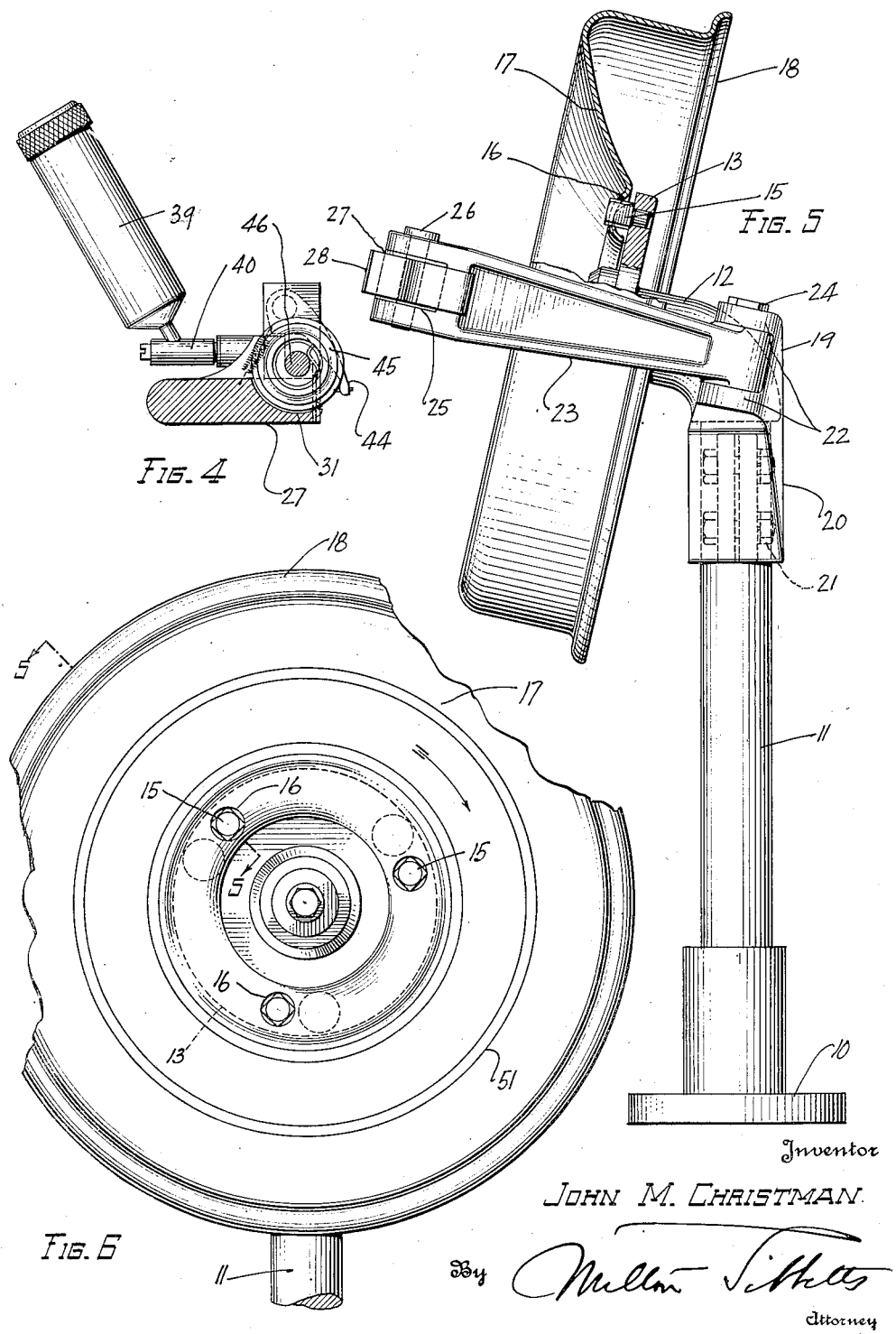
Inventor
JOHN M. CHRISTMAN Patented Dec. 11, 1934

1,983,792

UNITED STATES PATENT OFFICE 1,983,792

MEANS FOR STRIPING

John M. Christman, Detroit, Mich., assignor to Packard Motor Car Company, Detroit, Mich., a corporation of Michigan Application June 28, 1929, Serial No. 374,364

3 Claims. (Cl. 91—12)

This invention relates to striping and more particularly to a machine for striping wheels.

An object of the invention is to provide a machine for applying annular stripes of uniform width and thickness.

Another object of the invention is to provide a machine for applying a plurality of stripes to a wheel or work piece while the wheel or work piece is in motion.

Another object of the invention is to provide a machine for simultaneously applying a plurality of spaced annular stripes of various colors and of uniform widths and thicknesses.

A further object of the invention is to provide a machine for applying a plurality of stripes to a wheel or a work piece by rotating the wheel or work piece, and adjusting the striping means thereto to apply the stripes at a rate proportionate to the rate of rotation of the wheel or work piece.

Yet a further object of the invention is to provide a machine for applying annular stripes in which the structure is exceedingly cheap and simple, durable and efficient in operation.

Still a further object of the invention is to provide a machine for applying a stripe to a wheel or work piece which does not require any particular skill on the part of the operator to apply the stripe with precision.

With these and other objects in view which may be incident to my improvements, the invention consists in the parts and combinations to be hereinafter set forth and claimed with the understanding that the several necessary elements comprising the invention may be varied in construction, proportion, and arrangement, without departing from the spirit and scope of the appended claims.

In order to make my invention more clearly understood, I have shown in the accompanying drawings means for carrying the same into practical effect, without limiting the improvements in their useful applications to the particular construction, which for the purpose of explanation has been made the subject of illustration.

In the drawings forming a part of this specification:

Figure 1 is a top plan view of a machine embodying the invention, with a wheel positioned thereon partly in section and partly broken away, Figure 2 is a sectional view substantially on lines 2—2, Figure 1, Figure 3 is a cross sectional view substantially on lines 3—3, Figure 1, with parts broken away, Figure 4 is a cross sectional view substantially on lines 4—4, Figure 1, Figure 5 is a side elevation of the machine illustrating a wheel positioned therein with parts of the wheel in section, Figure 6 is an enlarged side elevation of a wheel partly broken away, illustrating the method of applying the stripes.

Referring to the drawings for more specific details of the invention, 10 represents a base which may be any desirable structure suitable for supporting a column 11. The column has positioned thereon an arm 12, preferably adjustable so that the elevation thereof may be readily varied. Positioned on the free end of the arm is a rotatable member 13. As shown, the rotatable member 13 is mounted on the arm with suitable ball bearings 14 interposed, and the member is provided with a plurality of equally spaced studs 15, adapted to engage openings 16 in the disk 17 of the wheel 18, to position and retain the wheel on the rotatable member.

The column 11 has adjustably secured thereto an arm 19. As shown, the arm 19 is provided on one end with a clamp 20 secured to the column 11 as by bolts 21. The other end of the arm is provided with spaced eyes 22 between which is pivoted an arm 23 on a pintle 24 passing through the eyes. As shown, the pintle 24 is threaded into one of the eyes 22 so that the arm 23 may be firmly held in any adjusted position. The arm 23 is bifurcated as at 25, and pivoted therein on a suitable pintle 26 is an arm 27. The movement of the arm 27 is limited in one direction as by a spring 28 suitably secured in the arm 23, and the arm 27 is provided with a plurality of transversely disposed slots 29, 30, 31, 32, and 33, in which is mounted apparatus to be hereinafter described.

As shown, the slots 29 and 33 each have positioned therein pump mechanisms 34 and 35 preferably of the gear type. Each of the pump mechanisms 34 and 35 comprise extremely small intermeshing gears 36 and 37, one of which, the gear 37, is driven by a shaft 38 journalled in the arm 27 and extending into the slots 30 and 32 respectively. Each of the pump mechanisms 34 and 35 have positioned thereon a suitable container 39, connected by passages 40 with the intake port 41 of the pump, the outlet 42 of which is connected as by a suitable passage 43 to a plurality of nozzles 44.

The nozzles 44 are ranged in pairs to apply two parallel stripes of uniform width and thickness. It will, of course, be clearly understood that these nozzles may be varied to apply stripes of any desirable width and thickness, and also that different colors may be used in the respective pumps so that stripes of various colors may be applied.

The operation of the pumps is effected through a suitable roller 45 positioned in the slot 31 and keyed to a shaft 46. The shaft is preferably mounted on ball bearings 47 in the arm 27 and extends in opposite directions from the roller into the slots 30 and 32 where it is suitably connected as by Oldham couplings 48 to the shafts 38 to operate the pumps. The roller 45 has its periphery preferably covered with rubber or felt so that when engaging the disk of the wheel, it will not injure the painted surface thereon.

In operation, the arm 27 is swung back against the spring 28 and a disk wheel is positioned on the rotating member 13, where it is firmly held by the studs 15 engaging the openings in the disk. With the wheel in this position, it is rotated by hand with sufficient force that the rotation thereof will continue for a limited time.

Assuming that the containers 39 have been filled with a suitable liquid for applying a stripe, such as paint, lacquer or the like, and that the roller 45 has been rotated sufficiently to operate the pump mechanism to draw the liquid from the container through the gears and force it to the delivery end of the nozzles, the arm 27 is swung so that the roller 45 engages the disk 17 of the wheel while it is still rotating.

The revolving wheel 18 imparts a rotary movement to the roller 45 and the roller drives the shafts 38 to operate the pumps 34 and 35 to deliver the paint from the container 39 to and through the pump to the delivery end of the nozzle at a rate proportionate to the rate of rotation of the wheel; so that the various stripes are applied simultaneously.

It will, of course, be understood that while I have shown means for applying four stripes arranged in pairs and in spaced relation with respect to the pairs and to each other, different arrangement may be had by varying the number of pump mechanisms, or by varying the number of nozzles or the size of the nozzles, such variation being entirely within the discretion and according to the artistic temperament of the manufacturer.

While I have shown and described the preferred embodiment of my invention, I wish it to be understood that I do not confine myself to precise details herein set forth by way of illustration; as it is apparent that many changes and variations may be made therein by those skilled in the art, without departing from the spirit of the invention, or exceeding the scope of the appended claims.

Having thus described the various features of my invention, what I claim as new and desire to secure by Letters Patent is:

1. A striping instrument for painting a plurality of stripes comprising a standard having a pivoted arm formed with a plurality of notches, a roller in one of the notches, a plurality of pumps in the remainder of the notches, and a driving connection between the roller and the pumps.

2. An instrument for painting a stripe comprising a standard, an arm pivotally mounted on the standard, said arm having a plurality of notches therein, a roller in one of the notches having a portion projecting beyond the arm, a pump in one of the notches, and a driving connection between the roller and the pump.

3. An instrument for painting a stripe comprising a standard, an arm pivotally mounted on the standard, said arm having a plurality of notches along a surface thereof, a roller in one of the notches having a portion projecting beyond the arm, a pump in one of the notches, a driving connection between the roller and the pump, and a dispensing nozzle mounted on the arm in communication with said pump, said nozzle having its outlet end projecting beyond the arm substantially the same distance as the roller.

JOHN M. CHRISTMAN.